United States Patent [19]

Saho et al.

[11] Patent Number: 4,987,203

[45] Date of Patent: Jan. 22, 1991

[54] POLYORGANOSILOXANE COMPOUNDS WITH EPOXY GROUP

[75] Inventors: Takahiro Saho; Yoshinori Akutsu; Takaharu Nakano; Nobumasa Ohtake, all of Yokohama, Japan

[73] Assignee: Chisso Corporation, Japan

[21] Appl. No.: 426,030

[22] Filed: Oct. 24, 1989

[30] Foreign Application Priority Data

Oct. 25, 1988 [JP] Japan .................. 63-268754

[51] Int. Cl.$^5$ .............................................. C08G 77/04
[52] U.S. Cl. ........................................ 528/27; 528/31; 528/15; 556/479
[58] Field of Search ...................... 528/31, 27, 15; 556/479

[56] References Cited

U.S. PATENT DOCUMENTS

| | | | |
|---|---|---|---|
| 4,122,246 | 10/1978 | Sierawski | 528/32 |
| 4,658,049 | 4/1987 | Nakano et al. | 556/437 |
| 4,684,709 | 8/1987 | Ona et al. | 528/27 |

*Primary Examiner*—melvyn I. Marquis
*Assistant Examiner*—Karen A. Hellender
*Attorney, Agent, or Firm*—Leydig, Voit & Mayer

[57] ABSTRACT

A polyorganosiloxane compound contains a fluorine-containing substituent at least at its $\alpha$-, $\alpha'$- or $\alpha''$-position and a substituent having an epoxy linkage at its $\omega$-position. The polyorganosiloxane compound can provide a synthetic resin with properties which cannot be provided by conventional polysiloxane compound by incorporating the polyorganosiloxane compound into the synthetic resin through a chemical linkage via the epoxy linkage thereof and a group reactive with the epoxy linkage thereof.

12 Claims, No Drawings

POLYORGANOSILOXANE COMPOUNDS WITH EPOXY GROUP

BACKGROUND OF THE INVENTION

1. Field of the Invention

The present invention relates to a novel polyorganosiloxane compound suitable for modifying synthetic resins.

2. Description of Related Art

Heretofore, silicone resins have been employed for providing synthetic resin molded products with various characteristics including surface properties such as water repellency, mold releasability and antifouling property inherent in siloxane compounds as well as thermal resistance. These silicone resins are mainly composed of linear polysiloxane compounds. The linear polysiloxane compounds are blended if they do not possess a group or they are chemically introduced into the resins if they possess a group or groups reactive therewith.

Increasing attention has recently been paid to polysiloxane compounds which may be used as raw materials of graft polymers for modifying synthetic resins. As such, polysiloxane compounds have been mainly employed as so-called "polysiloxane compounds modified at one terminal" in which a functional group resides at only one of the terminals and a trimethylsiloxy group resides at the other terminal.

When the polysiloxane compounds are used with the attempt to improve characteristics of synthetic resins in order to satisfy recent demands for higher functional characteristics, they suffer the disadvantages that sufficient improvements in characteristics of the synthetic resins cannot be achieved or a large quantity of the polysiloxanes must be added to achieve characteristics sought to be performed by addition, thereby adversely affecting other characteristics, because the conventional polysiloxane compounds rely on improvements in properties upon their inherent functions.

When there is used a polysiloxane compound wherein both of its terminals are provided with the same substituents which are not reactive with the objective synthetic resin, i.e., a so-called "polysiloxane compound modified at both terminals", it presents the problems that an amount of the polysiloxane compound to be added cannot be increased on account of bleeding and fluctuations in characteristics which may occur to a remarkably large extent as time elapses, whereby the expected characteristics cannot be maintained for a long period of time.

On the contrary, when the polysiloxane modified at both terminals with substituents is reactive with the synthetic resins which are used for their surface modifications, it also poses the difficulty that a large amount of the polysiloxane compound should be added to achieve the properties as required, thereby resulting in a remarkable reduction in other properties. Furthermore, it is difficult to use these polysiloxane compounds modified at both terminals as graft polymers which has recently drawn increasing attention for modifying surfaces of the synthetic resins.

In the polysiloxane compound modified at its one terminal, a group at its one terminal which is not reactive with the synthetic resins is generally constituted by trimethylsiloxy group, and modifications of characteristics for the synthetic resins are dependent upon the properties of the polysiloxane compound itself. Therefore, demands for higher functions are not achieved to a sufficient extent or a large amount of the polysiloxane compound should be added in order to satisfy the characteristics sought to be attained, thus adversely affecting other properties.

It is further to be noted that dimethylsiloxane alone, in which its terminal is terminated by the trimethylsiloxy group, can little improve oil repellency.

SUMMARY OF THE INVENTION

Therefore, the present invention has the object to provide a novel polyorganosiloxane compound having at one terminal a fluoroalkyl group and at the other terminal a group reactive with a synthetic resin, which can improve the difficulties and problems prevailing in conventional polysiloxane compounds.

In order to achieve the above-mentioned object, the present invention is completed as a result of extensive research that an organosiloxane compound has been provided which has a fluorine-containing substituent at least at its α-position and a substituent having an epoxy linkage at its ω-position, which has a fluorine-containing substituent at least either at its α- or α'-position and a substituent having an epoxy linkage at its ω-position, and which has a fluorine-containing substituent at least either at its α-, α'- or α''-position and a substituent having an epoxy linkage at its ω-position.

In accordance with the present invention, the first feature is directed to an organosiloxane compound represented by the following general formula (I):

wherein j is an integer from 2 to 2,000;

$R^1$ is a pentafluorophenyl group or a linear or branched fluoroalkyl group as represented by the following general formula (II):

$$C_aH_bF_{2a-b+1} \quad (II)$$

wherein a is an integer from 3 to 18 and b is an integer from 0 to 2a $R^2$ is a substituent as represented by following formula (III):

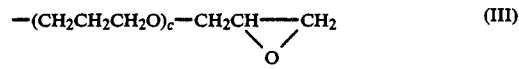

wherein c is an integer from 1 to 5; or a substituent as represented by the following formula (IV):

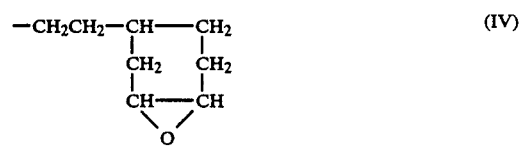

$R^3$ and $R^4$ are independently each an alkyl group having from 1 to 4 carbon atoms or a phenyl group.

A preferred embodiment of the first feature of the present invention is directed to an organosiloxane compound in which the substituent represented by the symbol $R^1$ is pentafluorophenyl group, 3,3,3-trifluoropropyl group, tridecafluoro-1,1,2,2-tetrahydrooctyl group or heptadecafluoro-1,1,2,2-tetrahydrodecyl group.

The second feature of the present invention is directed to an organosiloxane compound having at least one fluorine-containing substituent in its molecule as represented by the following general formula (V):

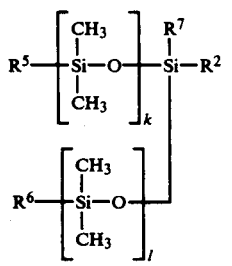

(V)

wherein k and l each are an integer from 2 to 2,000;

$R^5$ and $R^6$ are independently each an alkyl group having from 1 to 4 carbon atoms, pentafluorophenyl group or a linear or branched fluoroalkyl group as represented by the following general formula (II):

$$C_aH_bF_{2a-b+1} \quad (II)$$

wherein a is an integer from 3 to 18 and b is an integer from 0 to 2a, provided, however, that at least one of $R^5$ and $R^6$ is a fluorine-containing substituent selected from the above substituents;

$R^2$ is a substituent as represented by following formula (III):

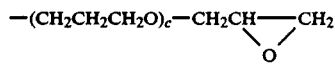

(III)

wherein c is an integer from 1 to 5; or represented by the following formula (IV):

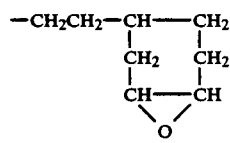

(IV)

$R^7$ is an alkyl group having from 1 to 4 carbon atoms or a phenyl group.

A preferred embodiment of the second feature of the present invention is directed to an organosiloxane compound in which the substituents represented by the symbols $R^5$ and $R^6$ in the general formula (V) are each an alkyl group having one to four carbon atoms, pentafluorophenyl group, 3,3,3-trifluoropropyl group, tridecafluoro-1,1,2,2-tetrahydrooctyl group or heptadecafluoro-1,1,2,2-tetrahydrodecyl group, however, it is provided that at least one of $R^5$ and $R^6$ is a fluorine-containing substituent selected from the above substituents.

In accordance with the present invention, the third feature is directed to an organosiloxane compound as represented by the following general formula (VI):

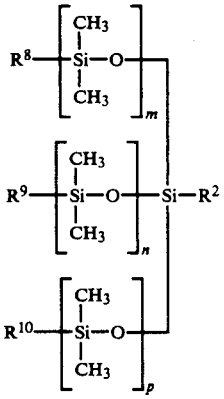

(VI)

wherein m, n and p each are an integer from 2 to 2,000;

$R^8$, $R^9$ and $R^{10}$ are independently each an alkyl group having from 1 to 4 carbon atoms, pentafluorophenyl group or a linear or branched fluoroalkyl group as represented by the following general formula (II):

$$C_aH_bF_{2a-b+1} \quad (II)$$

wherein a is an integer from 3 to 18 and b is an integer from 0 to 2a, provided, however, that at least one of $R^8$, $R^9$ and $R^{10}$ is a fluorine-containing group selected from the above substituents;

$R^2$ is a substituent as represented by the following formula (III):

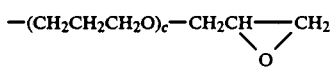

(III)

wherein c is an integer from 1 to 5; or represented by the following formula (IV):

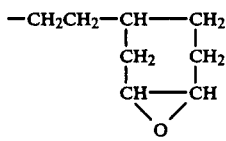

(IV)

A preferred embodiment of the third feature of the present invention is directed to an organosiloxane compound in which the substituents as represented by the reference symbols $R^8$, $R^9$ and $R^{10}$ of the general formula (VI) in the fifth feature above are each an alkyl group having from one to four carbon atoms, pentafluorophenyl group, 3,3,3-trifluoropropyl group, tridecafluoro-1,1,2,2-tetrahydrooctyl group or heptadecafluoro-1,1,2,2-tetrahydrodecyl group and at least one of $R^8$, $R^9$ and $R^{10}$ is a fluorine-containing substituent selected from the above substituents.

DESCRIPTION OF THE PREFERRED EMBODIMENTS

The polyorganosiloxane compounds, as represented by the general formula (I) of the first feature of the present invention, by the general formula (V) of the second feature thereof, and by the general formula (VI) of the third feature thereof, are characterized in that they are provided in their molecules with a substituent containing an epoxy linkage at their one terminal and a fluoro-containing substituent at their other terminal. This can be applied to the polyorganosiloxane compound having a larger molecular weight in which the reference symbol j in the general formula (I), k and l in the general formula (V), as well as m, n and p in the general formula (VI) become larger. The polyorganosiloxane compounds according to the present invention are further characterized by the location of the epoxy-linkage-containing substituent at one terminal and of the fluoro-containing substituent at the other terminal in their molecules and, if necessary, by a well controlled molecular weight distribution as much as a degree of polydispersion (dispersity) of from 1.1 to 1.2.

As is apparent from the general formulas (I), (V) and (VI), the respective reference symbols j, k, l, m, n and p each represent the number of dimethylsiloxane units of the linear polydimethylsiloxane compound, each of the reference symbols is in the range from 2 to 2,000, preferably from 4 to 700, in order to ensure a sure production of functional characteristics inherent in the polydimethylsiloxane compound when introduced into the synthetic resins as well as to facilitate an introduction thereof into the synthetic resin and to enable a ready synthesis.

When the polyorganosiloxane compounds represented by the general formulas (I), (V) and (VI) of the respective first, second and third features according to the present invention are introduced into the synthetic resins, it is particularly preferred to use the polyorganosiloxane compound in which each of the reference symbols j, k, l, m, n and p in the corresponding general formulas (I), (V) and (VI) is preferably below approximately 700 although preferred conditions for introduction of the polyorganosiloxane compounds into the synthetic resins may vary with the kind of the synthetic resins, properties of the polymers and functions required.

The fluoroalkyl group as represented by the general formula (II) in the first, second and third features according to the present invention is such that the symbol a ranges generally from 3 to 18, preferably from 3 to 10. This range is preferred in terms of ready availability of raw materials, an effective production of functions inherent in the fluoroalkyl group, and a ready synthesis.

The substituent as represented by the general formula (III) in the first, second and third features of the present invention is such that the symbol c is in the range from 1 to 5, preferably from 1 to 3, depending upon ready availability of raw materials, functional properties, and readiness in synthesis.

The polyorganosiloxane compounds according to the present invention are characterized in that the number of the siloxane chains based on the epoxy-linkage-containing group are: one siloxane chain in the general formula (I) of the first feature of the invention, two siloxane chains in the general formula (V) of the second feature thereof, and three siloxane chains in the general formula (VI) of the third feature thereof. They may be arbitrarily chosen depending upon the kinds of the synthetic resins and functional characteristics to be added by introduction of the polyorganosiloxane compounds. They may be used singly or in combination thereof.

In many cases wherein the polyorganosiloxane compounds having two or three siloxane chains based on the epoxy-linkage-containing substituents, as represented by the general formula (V) of the second feature of the present invention or by the general formula (VI) of the third feature thereof, are used as graft polymers for modifying the synthetic resins, it is preferred that the chain lengths of the siloxane chains are substantially the same as each other in the same molecule, however, the polyorganosiloxane compound with the plural siloxane chains of different length may be used in accordance with the purpose of usage of the synthetic resins to which it is added. It is further to be noted that the substituents as represented by the symbols $R^5$ and $R^6$ of the general formula (V) in the second feature and the symbols $R^8$, $R^9$ and $R^{10}$ of the general formula (VI) in the third feature according to the present invention, which are different from each other, may be introduced into each of the siloxane chains of the polyorganosiloxane compounds having two or three siloxane chains based on the epoxy-linkage-containing substituent. However, in the case other than where it is required to add a unique function to the synthetic resin or to control functional characteristics more sensitively, it is preferred to use the polyorganosiloxane compounds with the plural siloxane chains having the same chain lengths and substituents, otherwise manufacturing steps are increased and an acceptable range of synthetic conditions becomes narrower.

The polyorganosiloxane compounds as represented by the general formula (I) in the first feature, by the general formula (V) in the second feature, and the general formula (VI) in the third feature of the present invention are useful for modifying properties of synthetic resins reactive with their epoxy linkage or linkages, such as epoxy resins, polyamides, polyurethanes or the like, by chemical introduction into the synthetic resins by reaction of their epoxy-linkage or linkages with the synthetic resins. This chemical introduction can provide a particularly superior surface modification of the synthetic resins.

The polyorganosiloxane compounds as represented by the general formulas (I), (V) and (VI) may be prepared by the following procedures:

(1) The polyorganosiloxane compound having one siloxane chain based on the epoxy-linkage-containing substituent:

Using a dimethylsilanol having the objective fluorine-containing substituent as an initiator, hexamethylcyclotrisiloxane is first subjected to anionic polymerization in the presence of a 0.05–50% mol lithium catalyst in a polar solvent having no active hydrogen. Dialkylchlorosilane is then added to terminate the polymerization, thereby yielding a dimethylsiloxane compound (VII) having the fluorine-containing substituent at its α-terminal and a hydrosilyl group at its ω-terminal.

The dimethylsiloxane compound (VII) is then hydrosilylated with the compound (VIII) or (IX) in the presence of a catalyst to give the objective organosiloxane compound (I) above.

The reaction scheme may be described as follows:

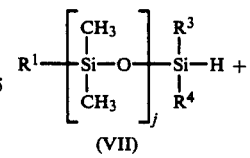

(VII)

-continued

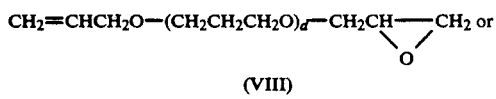

(VIII)

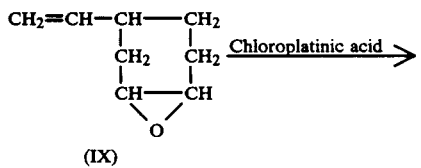 Chloroplatinic acid →

(IX)

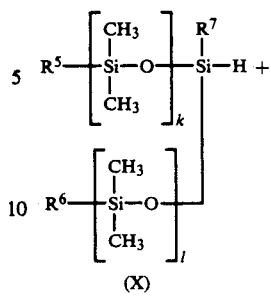

(X)

$$CH_2=CHCH_2O-(CH_2CH_2CH_2O)_d-CH_2CH\underset{O}{\overset{\diagdown\diagup}{-}}CH_2 \text{ or}$$

(VIII)

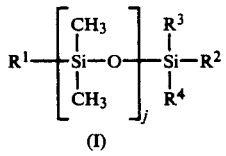 Chloroplatinic acid →

(IX)

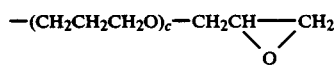

(I)

in which
j is an integer from 2 to 2,000;
R$^1$ is a pentafluorophenyl group or a linear or branched fluoroalkyl group as represented by the following general formula (II):

$$C_aH_bF_{2a-b+1} \tag{II}$$

wherein a is an integer from 3 to 18; and b is an integer from 0 to 2a
R$^2$ is a substituent as represented by the following formula (III):

$$-(CH_2CH_2CH_2O)_c-CH_2CH\underset{O}{\overset{\diagdown\diagup}{-}}CH_2 \tag{III}$$

wherein c is an integer from 1 to 5; or represented by the following formula (IV):

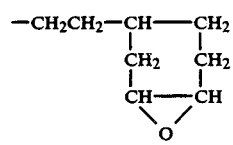 (IV)

R$^3$ and R$^4$ are independently each an alkyl group having from 1 to 4 carbon atoms or a phenyl group.

(2) The polyorganosiloxane compound having two siloxane chains based on the epoxy-linkage-containing substituent:

Using dimethyl silanol containing the objective fluorine-containing substituent or a mixture thereof with a dimethyl silanol having no fluorine-containing substituent as an initiator, hexamethylcyclotrisiloxane is first subjected to anionic polymerization in the presence of a 0.05–50 mol % lithium catalyst in a polar solvent having no active hydrogen. Monoalkyl dichlorosilane is then added to terminate the polymerization, thereby yielding a dimethylsiloxane compound (X) having the fluorine-containing substituent at least at its α- or α'-terminal and a hydrosilyl group at its ω-terminal.

The dimethylsiloxane compound (X) is then hydrosilylated with the compound of the formula (VIII) or (IX) in the presence of a catalyst to give the objective organosiloxane compound (V).

The reaction scheme may be described as follows:

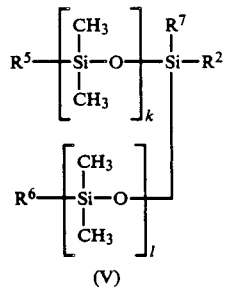

(X)

$$CH_2=CHCH_2O-(CH_2CH_2CH_2O)_d-CH_2CH\underset{O}{\overset{\diagdown\diagup}{-}}CH_2 \text{ or}$$

(VIII)

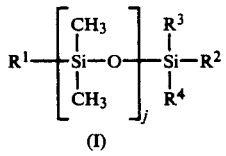 Chloroplatinic acid →

(IX)

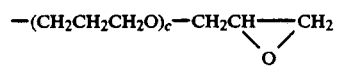

(V)

in which
k and l are each an integer from 2 to 2,000;
R$^5$ and R$^6$ are independently each an alkyl group having from 1 to 4 carbon atoms, pentafluorophenyl group or a linear or branched fluoroalkyl group as represented by the following general formula (II):

$$C_aH_bF_{2a-b+1} \tag{II}$$

wherein a is an integer from 3 to 18 and b is an integer from 0 to 2a, provided, however, that at least one of R$^5$ and R$^6$ is the fluorine-containing substituent selected from the above substituents;
R$^2$ is a substituent as represented by following formula (III):

$$-(CH_2CH_2CH_2O)_c-CH_2CH\underset{O}{\overset{\diagdown\diagup}{-}}CH_2 \tag{III}$$

wherein c is an integer from 1 to 5; or represented by the following formula (IV):

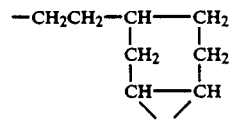 (IV)

$R^7$ is an alkyl group having from 1 to 4 carbon atoms or a phenyl group.

(3) The polyorganosiloxane compound having three siloxane chains based on the epoxy-linkage-containing substituent:

Using dimethyl silanol containing the objective fluorine-containing substituent or a mixture thereof with a dimethyl silanol having no fluorine-containing substituent as an initiator, hexamethylcyclotrisiloxane is first subjected to anionic polymerization in the presence of a 0.05–50% mol lithium catalyst in a polar solvent having no active hydrogen. Trichlorosilane is then added to terminate the polymerization, thereby yielding a dimethylsiloxane compound (XI) having the fluorine-containing substituent at least at its α-, α'- or α''-terminal position and a hydrosilyl group at its ω-terminal position.

The dimethylsiloxane compound (XI) is then hydrosilylated with the compound of the formula (VIII) or (IX) in the presence of a catalyst to give the objective organosiloxane compound (VI).

The reaction scheme may be described as follows:

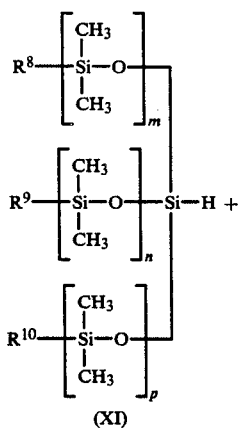

(XI)

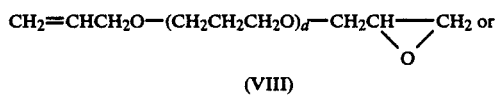

(VIII)

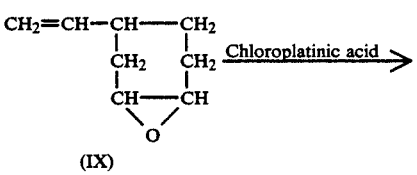

(IX)

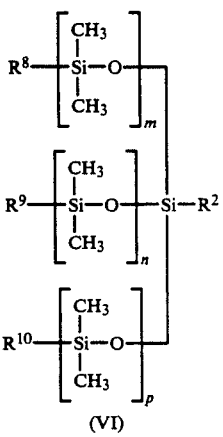

(VI)

in which m, n and p are independently each an integer of 2 to 2,000;

$R^8$, $R^9$ and $R^{10}$ are independently each an alkyl group having from 1 to 4 carbon atoms, pentafluorophenyl group or a linear or branched fluoroalkyl group as represented by the following general formula (II):

$$C_aH_bF_{2a-b+1} \quad \text{(II)}$$

wherein a is an integer from 3 to 18 and b is an integer from 0 to 2a, provided, however, that at least one of $R^8$, $R^9$ and $R^{10}$ is the fluorine-containing substituent selected from the above substituents;

$R^2$ is a substituent as represented by following formula (III):

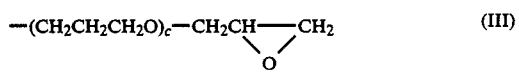

(III)

wherein c is an integer from 1 to 5; or represented by the following formula (IV):

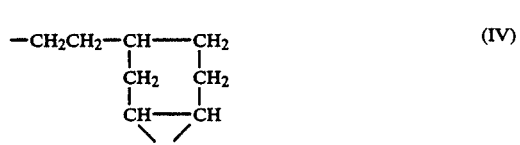

(IV)

In preparing the polyorganosiloxane compounds according to the present invention having one, two or three siloxane chains based on the epoxy-linkage-containing substituent, a control over molecular weights and a distribution of molecular weights is determined by the siloxane compounds represented by the formulas (VII), (X), and (XI), respectively, in the embodiments of the preparing processes as have been described hereinbefore. The molecular weight may be readily controlled by changing ratios of silanol as an initiator to hexamethylcyclotrisiloxane. The siloxane compounds with the objective molecular weights may be readily synthesized if they would be those having a number-average molecular weight of approximately 150,000 or lower (2,000 or lower of siloxane units) per siloxane chain. The siloxane compounds having molecular weights larger than the above molecular weight may be adjusted by changing polymerization conditions.

The silanol to be used as an initiator for the anionic polymerization may readily be available by hydrolyzing a monochlorosilane having the objective fluoro-containing substituent. These chlorosilane substituted by tri-organic groups may include, for example, trimethylchlorosilane, ethyldimethylchlorosilane, n-butyldimethylchlorosilane, t-butyldimethylchlorosilane, isopropyldimethylchlorosilane, n-propyldimethylchlorosilane, pentafluorophenyldimethylchlorosilane, 3,3,3-trifluoropropyldimethylchlorosilane, (tridecafluoro-1,1,2,2-tetrahydrooctyl)dimethylchlorosilane, (heptadecafluoro-1,1,2,2-tetrahydrodecyl)dimethylchlorosilane or the like.

The lithium catalyst to be used for synthesis of the compound according to the present invention may include, for example, a metal lithium, butyl lithium, lithium hydroxide or a lithium silanolate substituted by a tri-organic group as represented by following general formula:

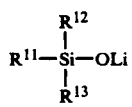

wherein $R^{11}$, $R^{12}$ and $R^{13}$ are each an alkyl group having from 1 to 4 carbon atoms, a phenyl group, a pentafluorophenyl group, or a linear or branched fluoroalkyl group as represented by formula:

$C_aH_bF_{2a-b+1}$ where a is an integer from 3 to 18 b is an integer from 0 to 2a.

It is further to be noted that, for example, a sodium catalyst, potassium catalyst or other alkali metal catalyst may be employed, however, it is not preferred because the yield of the siloxane compound may be reduced.

The amount of the catalyst for the anionic polymerization may be in the range generally from 0.05 mol % to 50 mol %, preferably from 0.05 mol % to 10 mol %, with respect to the amount of the silanol substituted by a tri-organic group as a polymerization initiator. If the catalyst is used in an amount below the lower limit, the polymerization velocity becomes too slow to be practical. A preferred upper limit of the amount of the catalyst may usually be 10 mol % or lower, however, it may be 50 mol %, or lower if the synthesis is carried out on a small scale or if metering would become inaccurate on account of too small an absolute amount of the catalyst to be added in synthesizing the siloxane compound of a higher molecular weight. Even if the catalyst is used in amounts from 50 mol % to 100 mol % unless a special circumstance would arise, synthesis proceeds without difficulty, however, the use of the catalyst in such a large amount is not preferred because it may cause problems with safety, production, and production cost, due to the use of a dangerous catalyst.

The polar solvent having no active hydrogen to be used for synthesis of the polyorganosiloxane compounds may include, for example, tetrahydrofuran, 1,4-dioxane, ethyleneglycol dimethylether, diethyleneglycol dimethylether, dimethylformamide, dimethylsulfoxide or the like. Preferred is tetrahydrofuran. The solvents may be used in combination thereof. A solvent with an active hydrogen interferes with the reaction and a non-polar solvent causes the reaction to proceed slowly so that these solvents cannot be used as a reaction solvent.

Reaction temperatures may be in the range generally from 0° C. to 50° C., preferably from 15° C. to 25° C. If the reaction temperature becomes too low, the polymerization speed becomes too slow to be practical, while a reaction temperature above the upper limit is not preferred because it causes the polysiloxane compound to have too too wide a distribution of molecular weights.

Reaction time may vary with reaction temperatures and it is preferred to suspend the reaction at the time when hexamethylenecyclotrisiloxane used is consumed by approximately 95%. For example, a period of time ranging from 10 to 20 hours is appropriate in the case of reaction temperatures ranging from 15° C. to 20° C. A reaction time longer than necessary is not preferred because it broadens the distribution of molecular weights too much.

For the hydrosilylation, the catalyst to be used may be a complex compound of a metallic element of Group VIII of the Periodic Table, including preferably chloroplatinic acid or a complex of platinum or rhodium with an olefin. An amount of chloroplatinic acid as a catalyst may be in the range preferably from $1\times10^{-3}$ to $1\times10^{-6}$ mol per mol of the siloxane compound as represented by the general formula (VII), (X) or (XI). If the catalyst is used above the upper limit, it may incur the increasing possibility of breaking the siloxane chain and raise the cost of production due to the use of the catalyst in too great an amount. If the amount of the catalyst is below the lower limit, the reaction becomes likely to undergo influences from a minute amount of moisture or substances detrimental to the reaction so that the reaction may not proceed in a smooth manner.

A reaction temperature may be in the range preferably from 50° C. to 150° C., more preferably from 80° C. to 120° C. The reaction temperature below the lower limit may pose problems such as the reaction does not proceed smoothly or the reaction period becomes too long. If the reaction temperature would exceed the upper limit, it is not preferred that a siloxane chain may be broken or a side reaction may arise upon breakage of the epoxy ring.

The processes as have been described hereinabove provide novel polyorganosiloxane compounds having the fluorine-containing substituent at its α-position and the epoxy-linkage-containing substituent at its ω-position, having the fluorine-containing substituent at least at its α- or α'-position and the epoxy-linkage-containing substituent at its ω-position, and having the fluorine-containing substituent at least at its α-, α'-or α"-position and the epoxy-linkage-containing substituent at its ω-position.

The present invention will be described more in detail by way of examples, but it should be understood that the present invention should be interpreted to be not restricted to those examples in any respect.

REFERENCE EXAMPLE 1:

Preparation of 1-(tridecafluoro-1,1,2,2-tetrahydrooctyl)-9-hydrodecamethyl pentasiloxane A 1-liter three-necked round flask with a stirrer and a cooler was charged with 100 ml of previously dried tetrahydrofuran, 100.0 g (0.238 mol) of (tridecafluoro-1,1,2,2-tetrahydrooctyl)dimethylsilanol, and 52.9 g (0.238 mol) of hexamethylcyclotrisiloxane in a nitrogen stream, and 0.79 ml of a hexane solution of butyl lithium (1.5 mol/liter) was added to the mixture. The polymerization was then carried out at 20° C. for 10 hours.

To the reaction mixture were then added 24.7 g (0.261 mol) of dimethylchlorosilane and 27 g of triethylamine, and the mixture was stirred for 1 hour to suspend the polymerization. The product was then transferred to a separatory funnel and the salt produced was removed by washing with water. The product was then dried over anhydrous sodium sulfate.

A low-boiling fraction of the reaction product was removed at 100° C./100 mmHg over a period of 2 hours and the objective product was left as a still residue in a substantially quantitative yield.

The resulting siloxane compound was measured for $^1$H-NMR spectrum, IR spectrum, and gel permeation chromatography (GPC) as well as the analysis results and Si-H group quantitation data and are as shown below. The resulting product was identified as having the following formula:

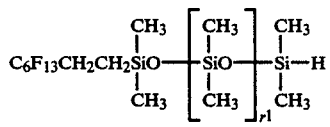

where
$r^1$ is given by the following formula (XII):

$$r^1 = \frac{\{(d-e)/h\} - f}{g} \quad \text{(XII)}$$

d = a molecular weight calculated from the quantitation data of Si-H groups;
e = a molecular weight of -Si(CH$_3$)$_{3-h}$H;
f = molecular weight of C$_6$F$_{13}$CH$_2$CH$_2$Si(CH$_3$)$_2$-O-; and
g = molecular weight of -Si(CH$_3$)$_2$O-; and
h = number of siloxane chains having the fluoro-containing substituent.

$^1$H-NMR (CDCl$_3$): δ ppm: 0.18 (Si (CH$_3$)$_2$, s, 30H); 0.53-2.80 (SiC$\underline{H}_2$C$\underline{H}_2$, broad, 4H); 4.55 (Si-$\underline{H}$, m, 1H).

| IR (BBr): | |
|---|---|
| 2970 cm$^{-1}$ | (C—H) |
| 2250 cm$^{-1}$ | (Si—H) |
| 1260 cm$^{-1}$ | (Si—CH$_3$) |
| 1250-1150 cm$^{-1}$ | (CF$_2$, CF$_3$) |
| 1120-1050 cm$^{-1}$ | (Si—O) |

| | |
|---|---|
| GPC (toluene), molecular weight converted into polystyrene number-average molecular weight (Mn) | 850 |
| weight-average molecular weight (Mw) | 930 |
| polydispersion degree (mw/Mn) | 1.1 |
| (calculated molecular weight, | 702) |
| Quantitation Data of Si—H group: | |
| H (ppm) | 1442 |
| Molecular weight calculated from H (ppm): | 693 |

EXAMPLE 1:

Preparation of 1-(tridecafluoro-1,1,2,2-tetrahydrooctyl)-9-(3-glycidoxypropyl)decamethylpentasiloxane A 1-liter three-necked round flask with a stirrer and a cooler was charged with 34.7 g of 1-(tridecafluoro-1,1,2,2-tetrahydrooctyl)-9-hydrodecamethylpentasiloxane prepared in Reference Example 1 above and 50 ml of toluene and the mixture was heated to 110° C. After 5.2×10$^{-4}$ g (1.0×10$^{-6}$ mol) of chloroplatinic acid was added, 6.28 g (0.055 mol) of allylglycidyl ether was added dropwise. After completion of dropwise addition, the mixture was aged by maintaining it at the reaction temperature of 110° C. for 5 hours.

A low-boiling fraction of the reaction product was removed off at 100° C./100 mmHg over the period of 2 hours and the objective product was left as a still residue in a substantially quantitative yield.

The resulting siloxane compound was measured for $^1$H-NMR spectrum, IR spectrum, gel permeation chromatography (GPC) and viscosity, as well as the analysis results and epoxy group quantitation data, as shown below. The resulting product was identified as having the following formula:

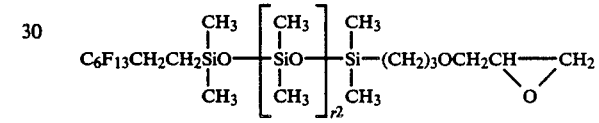

where
$r^2$ is given by the following formula (XIII):

$$r^2 = \frac{\{(d'-e')/h\} - f}{g} \quad \text{(XIII)}$$

d' = a molecular weight calculated from the quantitation data of epoxy groups;
e' = molecular weight of

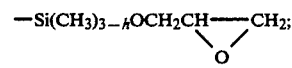

f, g and h = same meanings as above.

| $^1$H-NMR (CDCl$_3$): δ ppm | |
|---|---|
| 0.18 | (Si(C$\underline{H}_3$)$_2$, s, 30H) |
| 0.53-2.80 | (SiC$\underline{H}_2$C$\underline{H}_2$—, broad, 8H) |
| 2.30-2.60 | (—C⎯⎯CH$_2$, m, 2H) $\underset{O}{\diagdown\diagup}$ |
| 2.85-3.20 | (—C$\underline{H}$⎯⎯C, m, 1H) $\underset{O}{\diagdown\diagup}$ |
| 3.20-3.65 | (—C$\underline{H}_2$—O—C$\underline{H}_2$—, m, 4H) |

| IR (KBr): | |
|---|---|
| 2970 cm$^{-1}$ | (C—H) |
| 1260 cm$^{-1}$ | (Si—CH$_3$) |
| 1250-1150 cm$^{-1}$ | (CF$_2$, CF$_3$) |

-continued

| | |
|---|---|
| 1120–1050 cm$^{-1}$ | (Si—O) |

| | |
|---|---|
| GPC (toluene), molecular weight converted into polystyrene number-average molecular weight (Mn) | 895 |
| weight-average molecular weight (Mw) | 1,070 |
| polydispersion degree (Mw/Mn) | 1.2 |
| (calculated molecular weight, | 816) |
| Quantitation Data of Epoxy Group: | |
| Epoxy oxygen (% by weight) | 1.80 |
| Viscosity (25° C.): | 12 centipoises |

REFERENCE EXAMPLE 2:

Preparation of dimethylsiloxane compound having a tridecafluoro-1,1,2,2-tetrahydrooctyl group at its α-position and a hydrosilyl group at its ω-position A 5-liter three-necked round flask with a stirrer and a cooler was charged with 2,000 ml of previously dried tetrahydrofuran, 12.0 g (0.0285 mol) of (tridecafluoro-1,1,2,2-tetrahydrooctyl)dimethylsilanol, and 1981.1 g (8.90 mol) of hexamethylcyclotrisiloxane in a N$_2$ stream. After addition of 0.095 ml of a hexane solution of butyl lithium (1.5 mol/liter), the polymerization was carried out at 20° C. for 20 hours.

To the reaction mixture were added 2.97 g (0.0313 mol) of dimethylchlorosilane and 3.17 g of triethylamine, and the mixture was stirred for 1 hour to suspend the polymerization. The reaction mixture was then transferred to a separatory funnel and the salt produced was removed by washing with water. Thereafter, the reaction product was dried over anhydrous sodium sulfate.

A low-boiling fraction of the reaction product was removed at 100° C./10 mmHg over a period of 2 hours and the objective product was left as a still residue in a substantially quantitative yield.

The resulting siloxane compound was measured for IR spectrum, gel permeation chromatography (GPC) and viscosity, as well as the analysis results and Si-H group quantitation data, as shown below.

| IR (KBr) | |
|---|---|
| 2970 cm$^{-1}$ | (C—H) |
| 2250 cm$^{-1}$ | (Si—H) |
| 1260 cm$^{-1}$ | (Si—CH$_3$) |
| 1250–1150 cm$^{-1}$ | (CF$_2$, CF$_3$) |
| 1120–1050 cm$^{-1}$ | (Si—O) |

| | |
|---|---|
| GPC (toluene), molecular weight converted into polystyrene number-average molecular weight (Mn) | 63,410 |
| weight-average molecular weight (Mw) | 75,930 |
| polydispersion degree (Mw/Mn) | 1.2 |
| Quantitation Data of Si—H group: | |
| H (ppm) | 15.1 |
| molecular weight calculated from H (ppm) | 66,225 |
| Viscosity (25° C.) | 3,538 centipoises |

EXAMPLE 2:

Preparation of dimethylsiloxane compound having a tridecafluoro-1,1,2,2-tetrahydrooctyl group at its α-position and a 2-(7-oxabicyclo[4,1,0]hept-3-yl)ethyl group at its ω-position A 3-liter three-necked round flask with a stirrer and a cooler was charged with 662.2 g of the dimethylsiloxane compound prepared in Reference Example 2 and 500 ml of toluene and the mixture was heated to 110° C. After 5.2×10$^{-4}$ g (1.0×10$^{-6}$ mol) of chloroplatinic acid was added to the mixture, 1.36 g (0.011 mol) of 3-ethenyl-7-oxabicyclo[4,1,0]heptane was dropwise added. After the completion of dropwise addition, the reaction mixture was aged by maintaining it at 110° C. for 20 hours.

A low-boiling fraction of the reaction product was removed at 100° C./10 mmHg over a period of 2 hours and the objective product was left as a still residue in a substantially quantitative yield.

The resulting siloxane compound was measured for IR spectrum, gel permeation chromatography (GPC) and viscosity, as well as the analysis results and epoxy group quantitation data, as shown below.

| IR (KBr): | |
|---|---|
| 2970 cm$^{-1}$ | (C—H) |
| 1260 cm$^{-1}$ | (Si—CH$_3$) |
| 1250–1150 cm$^{-1}$ | (CF$_2$, CF$_3$) |
| 1120–1050 cm$^{-1}$ | (Si—O) |

| | |
|---|---|
| GPC (toluene), molecular weight converted into polystyrene number-average molecular weight (Mn) | 64,400 |
| weight-average molecular weight (Mw) | 74,700 |
| polydispersion degree (Mw/Mn) | 1.2 |
| Quantitation Data of epoxy group: | |
| epoxy oxygen (% by weight) | 0.024 |
| Viscosity (25° C.): | 4,260 centipoises |

REFERENCE EXAMPLE 3:

Preparation of dimethylsiloxane compound with a heptadecafluoro-1,1,2,2-tetrahydrodecyl group at its α-position and a hydrosilyl group at its ω-position A 5-liter three-necked round flask with a stirrer and a cooler was charged with 2,000 ml of previously dried tetrahydrofuran, 100.0 g (0.1915 mol) of (heptadecafluoro-1,1,2,2-tetrahydrodecyl)dimethylsilanol, and 1,803.6 g (8.10 mol) of hexamethylcyclotrisiloxane in a N$_2$ stream. To this mixture was added 0.64 ml of a hexane solution of butyl lithium (1.5 mol/liter), and the mixture was subjected to polymerization at 20° C. for 15 hours.

To this reaction mixture were then added 19.9 g (0.211 mol) of dimethylchlorosilane and 21.4 g of triethylamine, and the mixture was stirred for 1 hour to suspend the polymerization. After the reaction mixture was transferred to a separatory funnel and the salt produced was removed by washing with water, the reaction product was dried over anhydrous sodium sulfate.

A low-boiling fraction of the reaction product was removed at 100° C./10 mmHg over a period of 2 hours and the objective product was left as a still residue in a substantially quantitative yield.

The resulting siloxane compound was measured for IR spectrum, gel permeation chromatography (GPC) and viscosity, as well as the analysis results and Si-H group quantitation data, as shown below.

| IR (KBr): | |
|---|---|
| 2970 cm$^{-1}$ | (C—H) |
| 2250 cm$^{-1}$ | (Si—H) |
| 1260 cm$^{-1}$ | (Si—CH$_3$) |
| 1250–1150 cm$^{-1}$ | (CF$_2$, CF$_3$) |
| 1120–1050 cm$^{-1}$ | (Si—O) |

| | |
|---|---|
| GPC (toluene), molecular weight converted into polystyrene number-average molecular weight (Mn) | 11,710 |
| weight-average molecular weight (Mw) | 12,896 |
| polydispersion degree (MW/Mn) | 1.1 |
| Quantitation Data of S—H group: | |
| H (ppm) | 103.3 |
| molecular weight calculated from H (ppm): | 9,680 |
| Viscosity (25° C.): | 147 centipoises |

EXAMPLE 3:

Preparation of dimethylsiloxane compound with a heptadecafluoro-1,1,2,2-tetrahydrooctyl group at its α-position and a 2-(7-oxabicyclo[4,1,0]hept-3-yl)ethyl group at its ω-position A 1-liter three-necked round flask with a stirrer and a cooler was charged with 96.8 g of the siloxane compound prepared in Reference Example 3 and 100 ml of toluene and the mixture was heated to 110° C. After addition of 5.2×10$^{-4}$ g (1.0×10$^{-6}$ mol) of chloroplatinic acid, 1.36 g (0.011 mol) of 3-ethenyl-7-oxabicyclo[4,1,0]heptane was dropwise added. After the completion of dropwise addition, the reaction mixture was aged by maintaining it at the reaction temperature of 110° C. for 20 hours.

A low-boiling fraction of the reaction product was removed at 100° C./10 mmHg over a period of 2 hours and the objective product was left as a still residue in a substantially quantitative yield.

The resulting siloxane compound was measured for IR spectrum, gel permeation chromatography (GPC) and viscosity, as well as the analysis results and epoxy group quantitation data, as shown below.

| IR (KBr): | |
|---|---|
| 2970 cm$^{-1}$ | (C—H) |
| 1260 cm$^{-1}$ | (Si—CH$_3$) |
| 1250–1150 cm$^{-1}$ | (CF$_2$, CF$_3$) |
| 1120–1050 cm$^{-1}$ | (Si—O) |

| | |
|---|---|
| GPC (toluene), molecular weight converted into polystyrene number-average molecular weight (Mn) | 11,440 |
| weight-average molecular weight (Mw) | 13,500 |
| polydispersion degree (Mw/Mn) | 1.2 |
| Quantitation Data of Epoxy Group: | |
| Epoxy oxygen (% by weight) | 0.017 |
| Viscosity (25° C.): | 183 centipoises |

REFERENCE EXAMPLE 4:

Preparation of dimethylsiloxane compound with a 3,3,3-trifluoropropyl group at its α-position and a hydrosilyl group at its ω-position A 2-liter three-necked round flask with a stirrer and a cooler was charged with 800 ml of previously dried tetrahydrofuran, 10.0 g (0.0581 mol) of (3,3,3-trifluoropropyl)dimethylsilanol, and 567.2 g (2.55 mol) of hexamethylcyclotrisiloxane in a N$_2$ stream. After 0.19 ml of a hexane solution of butyl lithium (1.5 mol/liter) was added, the mixture was polymerized at 20° C. for 15 hours.

To this reaction mixture were added 6.04 g (0.0639 mol) of dimethylchlorosilane and 6.5 g of triethylamine, and the resulting mixture was stirred for 1 hour to suspend the polymerization. The reaction mixture was then transferred to a separatory funnel and the salt produced was removed by washing with water. Thereafter, the reaction product was dried over anhydrous sodium sulfate.

A low-boiling fraction of the reaction product was removed at 100° C./10 mmHg over a period of 2 hours and the objective product was left as a still residue in a substantially quantitative yield.

The resulting siloxane compound was measured for IR spectrum, gel permeation chromatography (GPC) and viscosity, as well as the analysis results and epoxy group quantitation data, as shown below.

| IR (KBr): | |
|---|---|
| 2970 cm$^{-1}$ | (C—H) |
| 2250 cm$^{-1}$ | (Si—H) |
| 1260 cm$^{-1}$ | (Si—CH$_3$) |
| 1250–1150 cm$^{-1}$ | (CF$_2$, CF$_3$) |
| 1120–1050 cm$^{-1}$ | (Si—O) |

| | |
|---|---|
| GPC (toluene), molecular weight converted into polystyrene number-average molecular weight (Mn) | 9,520 |
| weight-average molecular weight (Mw) | 10,490 |
| polydispersion degree (Mw/Mn) | 1.1 |
| Quantitation Data of Si—H group: | |
| H (ppm) | 112.5 |
| molecular weight calculated from H (ppm): | 8,890 |
| Viscosity (25° C.):116 | centipoises |

EXAMPLE 4:

Preparation of dimethylsiloxane compound with a 3,3,3-trifluoropropyl group at its α-position and a 3-glycidoxypropyl group at its ω-position A 1-liter three-necked round flask with a stirrer and a cooler was charged with 88.9 g of the siloxane compound prepared in Reference Example 4 and 50 ml of toluene and the mixture was heated to 110° C. After addition of 5.2×10$^{-4}$ g (1.0×10$^{-6}$ mol) of chloroplatinic acid, 1.26 g (0.011 mol) of allylglycidyl ether was added. After the completion of dropwise addition, the reaction mixture was aged by maintaining it at the reaction temperature of 110° C. for 20 hours.

A low-boiling fraction of the reaction product was removed at 100° C./10 mmHg over a period of 2 hours and the objective product was left as a still residue in a substantially quantitative yield.

The resulting siloxane compound was measured for IR spectrum, gel permeation chromatography (GPC) and viscosity, as well as the analysis results and epoxy group quantitation data, as shown below.

| IR (KBr): | |
|---|---|
| 2970 cm$^{-1}$ | (C—H) |
| 1260 cm$^{-1}$ | (si—CH$_3$) |
| 1250-1150 Cm$^{-1}$ | (CF$_2$, CF$_3$) |
| 1120-1050 cm$^{-1}$ | (Si—O) |

| | |
|---|---|
| GPC (toluene), molecular weight converted into polystyrene number-average molecular weight (Mn) | 11,400 |
| weight-average molecular weight (Mw) | 12,900 |
| polydispersion degree (Mw/Mn) | 1.1 |
| Quantitation Data of Epoxy Group: | |
| Epoxy oxygen (% by weight) | 0.16 |
| Viscosity (25° C.): | 166 centipoises |

REFERENCE EXAMPLE 5:

Preparation of dimethylsiloxane compound with a pentafluorophenyl group at its α-position and a hydrosilyl group at its ω-position A 1-liter three-necked round flask with a stirrer and a cooler was charged with 100 ml of previously dried tetrahydrofuran, 10.0 g (0.04127 mol) of pentafluorophenyldimethylsilanol, and 194.0 g (0.138 mol) of hexamethylcyclotrisiloxane in a N$_2$ stream. After 0.14 ml of a hexane solution of butyl lithium (1.5 mol/liter) was added, the mixture was polymerized at 20° C. for 15 hours.

To this reaction mixture were added 4.29 g (0.0454 mol) of dimethylchlorosilane and 4.6 g of triethylamine, and the resulting mixture was stirred for 1 hour to suspend the polymerization. The reaction mixture was then transferred to a separatory funnel and the salt produced was removed by washing with water. Thereafter, the reaction product was dried over anhydrous sodium sulfate.

A low-boiling fraction of the reaction product was removed at 100° C./10 mmHg over a period of 2 hours and the objective product was left as a still residue in a substantially quantitative yield.

The resulting siloxane compound was measured for IR spectrum, gel permeation chromatography (GPC) and viscosity, as well as the analysis results and Si-H group quantitation data, as shown below.

| IR (KBr): | |
|---|---|
| 2970 cm$^{-1}$ | (C—H) |
| 2250 cm$^{-1}$ | (Si—H) |
| 1260 cm$^{-1}$ | (Si—CH$_3$) |
| 1120-1050 cm$^{-1}$ | (Si—O) |

| GPC (toluene), molecular weight converted into polystyrene | |
|---|---|
| number-average molecular weight (Mn) | 5,807 |
| weight-average molecular weight (Mw) | 6,370 |
| polydispersion degree (Mw/Mn) | 1.1 |
| Quantitation Data of Si—H group: | |
| H (ppm) | 203.3 |
| molecular weight calculated from H (ppm): | 4,920 |

| | |
|---|---|
| Viscosity (25° C.): | 64 centipoises |

EXAMPLE 5:

Preparation of dimethylsiloxane compound with a pentafluorophenyl group at its α-position and a 3-glycidoxypropyl group at its ω-position A 1-liter three-necked round flask with a stirrer and a cooler was charged with 49.2 g of the siloxane compound prepared in Reference Example 5 and 50 ml of toluene and the mixture was heated to 110° C. After addition of 5.2×10$^{-4}$ g (1.0×10$^{-6}$ mol) of chloroplatinic acid, 1.26 g (0.011 mol) of allylglycidyl ether was added dropwise. After the completion of dropwise addition, the reaction mixture was aged by maintaining it at the reaction temperature of 110° C. for 20 hours.

A low-boiling fraction of the reaction product was removed at 100° C./10 mmHg over a period of 2 hours and the objective product was left as a still residue in a substantially quantitative yield.

The resulting siloxane compound was measured for IR spectrum, gel permeation chromatography (GPC) and viscosity, as well as the analysis results and epoxy group quantitation data, as shown below.

| IR (KBr): | |
|---|---|
| 2970 cm$^{-1}$ | (C—H) |
| 1260 cm$^{-1}$ | (Si—CH$_3$) |
| 1250-1150 cm$^{-1}$ | (CF$_2$, CF$_3$) |
| 1120-1050 cm$^{-1}$ | (Si—O) |

| GPC (toluene), molecular weight converted into polystyrene | |
|---|---|
| number-average molecular weight (Mn) | 5,740 |
| weight-average molecular weight (Mw) | 6,430 |
| polydispersion degree (Mw/Mn) | 1.1 |
| Quantitation Data of Epoxy Group: | |
| Epoxy oxygen (% by weight) | 0.25 |
| Viscosity (25° C.): | 91 centipoises |

REFERENCE EXAMPLE 6:

Preparation of dimethylsiloxane compound with a tridecafluoro-1,1,2,2-tetrahydryooctyl group at its α-position and a hydrosilyl group at its ω-position A 5-liter three-necked round flask with a stirrer and a cooler was charged with 1,000 ml of previously dried tetrahydrofuran, 50.0 g (0.119 mol) of (tridecafluoro-1,1,2,2-tetrahydrooctyl)dimethylsilanol, and 1130.2 g (5.08 mol) of hexamethylcyclotrisiloxane in a N$_2$ stream. After 0.40 ml of a hexane solution of butyl lithium (1.5 mol/liter) was added, the mixture was polymerized at 20° C. for 15 hours.

To this reaction mixture were added 12.35 g (0.1306 mol) of dimethylchlorosilane and 14 g of triethylamine, and the resulting mixture was stirred for 1 hour to suspend the polymerization. The reaction mixture was then transferred to a separatory funnel and the salt produced was removed by washing with water. Thereafter, the reaction product was dried over anhydrous sodium sulfate.

A low-boiling fraction of the reaction product was removed at 100° C./10 mmHg over a period of 2 hours and the objective product was left as a still residue in a substantially quantitative yield.

The resulting siloxane compound was measured for IR spectrum, gel permeation chromatography (GPC) and viscosity, as well as the analysis results and Si-H group quantitation data, as shown below.

| IR (KBr): | |
|---|---|
| 2970 cm$^{-1}$ | (C—H) |
| 2250 cm$^{-1}$ | (Si—H) |
| 1260 cm$^{-1}$ | (Si—CH$_3$) |
| 1250–1150 cm$^{-1}$ | (CF$_2$, CF$_3$) |
| 1120–1050 cm$^{-1}$ | (Si—O) |

| GPC (toluene), molecular weight converted into polystyrene | |
|---|---|
| number-average molecular weight (Mn) | 11,910 |
| weight-average molecular weight (Mw) | 12,850 |
| polydispersion degree (Mw/Mn) | 1.1 |
| Quantitation Data of Si—H group: | |
| H (ppm) | 101.6 |
| molecular weight calculated from H (ppm): | 9,843 |
| Viscosity (25° C.): | 165 centipoises |

EXAMPLE 6:

Preparation of dimethylsiloxane compound with a tridecafluoro-1,1,2,2-tetrahydrooctyl group at its α-position and a 3-glycidoxypropyl group at its ω-position A 1-liter three-necked round flask with a stirrer and a cooler was charged with 98.4 g of the siloxane compound prepared in Reference Example 6 and 50 ml of toluene and the mixture was heated to 110° C. After addition of 5.2×10$^{-4}$ g (1.0×10$^{-6}$ mol) of chloroplatinic acid, 1.26 g (0.011 mol) of allylglycidyl ether was added dropwise. After the completion of dropwise addition, the reaction mixture was aged by maintaining it at the reaction temperature of 110° C. for 20 hours.

A low-boiling fraction of the reaction product was removed at 100° C./10 mmHg over a period of 2 hours and the objective product was left as a still residue in a substantially quantitative yield.

The resulting siloxane compound was measured for IR spectrum, gel permeation chromatography (GPC) and viscosity, as well as the analysis results and epoxy group quantitation data, as shown below, thereby leading to a determination of the formula as will be described hereinafter.

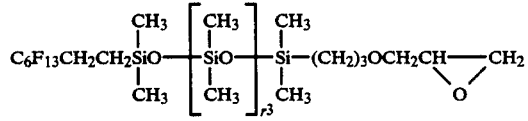

wherein
r$^3$ is determined in the same manner as is r$^2$ in formula (XIII) in Example 1, above.

| IR (KBr): | |
|---|---|
| 2970 cm$^{-1}$ | (C—H) |
| 1260 cm$^{-1}$ | (Si—CH$_3$) |
| 1250–1150 cm$^{-1}$ | (CF$_2$, CF$_3$) |
| 1120–1050 cm$^{-1}$ | (Si—O) |

| GPC (toluene), molecular weight converted into polystyrene | |
|---|---|
| number-average molecular weight (Mn) | 12,230 |
| weight-average molecular weight (Mw) | 13,820 |
| polydispersion degree (Mw/Mn) | 1.1 |
| Quantitation Data of Epoxy Group: | |
| Epoxy oxygen (% by weight) | 0.14 |
| Viscosity (25° C.): | 209 centipoises |

REFERENCE EXAMPLE 7:

Preparation of dimethylsiloxane compound having a tridecafluoro-1,1,2,2-tetrahydrooctyl group at its α- and α'-positions and a hydrosilyl group at its ω-position (two siloxane chains based on the hydrosilyl group)

A 5-liter three-necked round flask with a stirrer and a cooler was charged with 1,000 ml of previously dried tetrahydrofuran, 50.0 g (0.119 mol) of (tridecafluoro-1,1,2,2-tetrahydrooctyl)dimethylsilanol, and 1,130.2 g (5.08 mol) of hexamethylcyclotrisiloxane in a N$_2$ stream. After 0.40 ml of a hexane solution of butyl lithium (1.5 mol/liter) was added, the mixture was polymerized at 20° C. for 15 hours.

To this reaction mixture were added 7.51 g (0.0653 mol) of methyldichlorosilane and 14 g of triethylamine, and the resulting mixture was stirred for 1 hour to suspend the polymerization. The reaction mixture was then transferred to a separatory funnel and the salt produced was removed by washing with water. Thereafter, the reaction product was dried over anhydrous sodium sulfate.

A low-boiling fraction of the reaction product was removed at 100° C./10 mmHg over a period of 2 hours and the objective product was left as a still residue in a substantially quantitative yield.

The resulting siloxane compound was measured for IR spectrum, gel permeation chromatography (GPC) and viscosity, as well as the analysis results and Si-H group quantitation data, as shown below. It is further found that, as the molecular weights calculated from the GPC data and H (ppm) were virtually twice those of Reference Example 6 (having one siloxane chain based on the hydrosilyl group) in which the conditions and scales were the same as in this Reference Example yet only the kind of the chlorosilane added was changed, the reaction product has the following structure having two siloxane chains based on the hydrosilyl group.

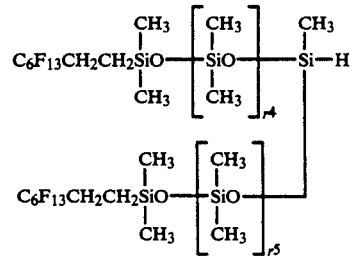

where an average of r$^4$ and r$^5$ is determined in the same manner as is r$^1$ in formula (XII) in Reference Example 1, above.

| IR (KBr): | |
|---|---|
| 2970 cm$^{-1}$ | (C—H) |

| -continued | |
|---|---|
| 2250 cm$^{-1}$ | (Si—H) |
| 1260 cm$^{-1}$ | (Si—CH$_3$) |
| 1250–1150 cm$^{-1}$ | (CF$_2$, CF$_3$) |
| 1120–1050 cm$^{-1}$ | (Si—O) |

| GPC (toluene), molecular weight converted into polystyrene | |
|---|---|
| number-average molecular weight (Mn) | 19,740 |
| weight-average molecular weight (Mw) | 23,720 |
| polydispersion degree (Mw/Mn) | 1.2 |
| Quantitation Data of Si—H group: | |
| H (ppm) | 53.9 |
| molecular weight calculated from H (ppm): | 18,550 |
| Viscosity (25° C.): | 423 centipoises |

EXAMPLE 7

Preparation of dimethylsiloxane with tridecafluoro-1,1,2,2-tetrahydrooctyl group at its α- and α'-positions and a 3-glycidoxypropyl group at its ω-position A 1-liter three-necked round flask with a stirrer and a cooler was charged with 185.5 g of the siloxane compound prepared in Reference Example 7 and 100 ml of toluene and the mixture was heated to 110° C. After 5.2×10$^{-4}$ g (1.0×10$^{-6}$ mol) of chloroplatinic acid was added, 1.26 g (0.011 mol) of allylglycidyl ether was dropwise added. After completion of dropwise addition, the mixture was aged by maintaining it at the reaction temperature of 110° C. for 20 hours.

A low-boiling fraction of the reaction product was removed at 100° C./10 mmHg over a period of 2 hours and the objective product was left as a still residue in a substantially quantitative yield.

The resulting siloxane compound was measured for IR spectrum, gel permeation chromatography (GPC) and viscosity, as well as the analysis results and epoxy group quantitation data, as shown below.

The resulting product was identified as having the following formula:

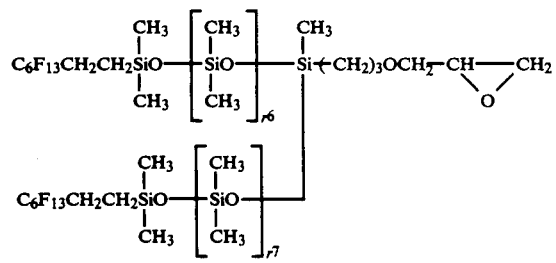

where an average of r$^6$ and r$^7$ is determined in the same manner as r$^2$ in formula (XIII) in Example 1, above.

| IR (KBr): | |
|---|---|
| 2970 cm$^{-1}$ | (C—H) |
| 1260 cm$^{-1}$ | (Si—CH$_3$) |
| 1250–1150 cm$^{-1}$ | (CF$_2$, CF$_3$) |
| 1120–1050 cm$^{-1}$ | (Si—O) |

| GPC (toluene), molecular weight converted into polystyrene | |
|---|---|
| number-average molecular weight (Mn) | 20,790 |
| weight-average molecular weight (Mw) | 24,800 |
| polydispersion degree (Mw/Mn) | 1.2 |
| Quantitation Data of Epoxy Group: | |
| Epoxy oxygen (% by weight) | 0.075 |
| Viscosity (25° C.): | 553 centipoises |

REFERENCE EXAMPLE 8

Preparation of dimethylsiloxane compound having a tridecafluoro-1,1,2,2-tetrahydrooctyl group at its α-, α'- and α"-positions and a hydrosilyl group at its ω-position (three siloxane chains based on the hydrosilyl group)

A 5-liter three-necked round flask with a stirrer and a cooler was charged with 1,000 ml of previously dried tetrahydrofuran, 50.0 g (0.119 mol) of (tridecafluoro-1,1,2,2-tetrahydrooctyl)dimethylsilanol, and 1,130.2 g (5.08 mol) of hexamethylcyclotrisiloxane in a N$_2$ stream. After 0.40 ml of a hexane solution of butyl lithium (1.5 mol/liter) was added, the mixture was polymerized at 20° C. for 15 hours.

To this reaction mixture were added 5.90 g (0.0435 mol) of trichlorosilane and 14 g of triethylamine, and the resulting mixture was stirred for 1 hour to suspend the polymerization. The reaction mixture was then transferred to a separatory funnel and the salt produced was removed by washing with water. Thereafter, the reaction product was dried over anhydrous sodium sulfate.

A low-boiling fraction of the reaction product was removed at 100° C./10 mmHg over a period of 2 hours and the objective product was left as a still residue in a substantially quantitative yield.

The resulting siloxane compound was measured for IR spectrum, gel permeation chromatography (GPC) and viscosity, as well as the analysis results and Si-H group quantitation data, as shown below. It is further found that, as the molecular weights calculated from the GPC data and H (ppm) were by virtually three times those of Reference Example 6 (having one siloxane chain based on the hydrosilyl group) in which the conditions and scales were the same as in this Reference Example yet only the kind of the chlorosilane added was changed, the reaction product has the following structure having three siloxane chains based on the hydrosilyl group.

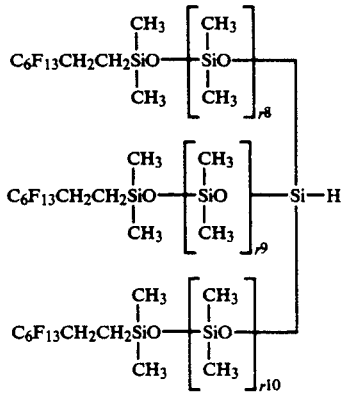

where an average of r$^8$, r$^9$ and r$^{10}$ is determined in the same manner as is r$^1$ in formula (XII) in Reference Example 1, above.

IR (KBr):

| | |
|---|---|
| 2970 cm$^{-1}$ | (C—H) |
| 2250 cm$^{-1}$ | (Si—H) |
| 1260 cm$^{-1}$ | (Si—CH$_3$) |
| 1250–1150 cm$^{-1}$ | (CF$_2$, CF$_3$) |
| 1120–1050 cm$^{-1}$ | (Si—O) |

GPC (toluene), molecular weight converted into polystyrene

| | |
|---|---|
| number-average molecular weight (Mn) | 33,790 |
| weight-average molecular weight (Mw) | 37,710 |
| polydispersion degree (Mw/Mn) | 1.1 |

Quantitation Data of Si—H group:

| | |
|---|---|
| H (ppm) | 33.8 |
| molecular weight calculated from H (ppm) | 29,590 |
| Viscosity (25° C.): | 681 centipoises |

EXAMPLE 8

Preparation of dimethylsiloxane compound with a tridecafluoro-1,1,2,2-tetrahydrooctyl group at its α-, α′- and α″-positions and a 3-glycidoxypropyl group at its ω-position A 1-liter three-necked round flask with a stirrer and a cooler was charged with 295.9 g of the siloxane compound prepared in Reference Example 8 and 100 ml of toluene and the mixture was heated to 110° C. After 5.2×10$^{-4}$ g (1.0×10$^{-6}$ mol) of chloroplatinic acid was added, 1.26 g (0.011 mol) of allyglycidyl ether was added dropwise. After completion of dropwise addition, the mixture was aged by maintaining it at the reaction temperature of 110° C. for 20 hours.

A low-boiling fraction of the reaction product was removed at 100° C./10 mmHg over a period of 2 hours and the objective product was left as a still residue in a substantially quantitative yield.

The resulting siloxane compound was measured for IR spectrum, gel permeation chromatography (GPC) and viscosity, as well as the analysis results and epoxy group quantitation data, as shown below.

The resulting product was identified as having the following formula:

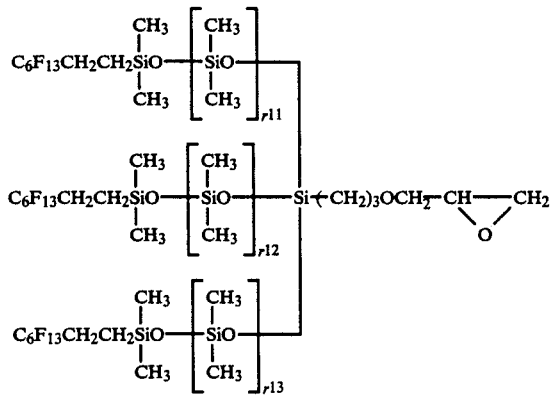

where an average of r$^{11}$, r$^{12}$ and r$^{13}$ is determined in the same manner as is r$^2$ in formula (XIII) in Example 1, above.

IR (KBr):

| | |
|---|---|
| 2970 cm$^{-1}$ | (C—H) |
| 1260 cm$^{-1}$ | (Si—CH$_3$) |
| 1250–1150 cm$^{-1}$ | (CF$_2$, CF$_3$) |
| 1120–1050 cm$^{-1}$ | (Si—O) |

GPC (toluene), molecular weight converted into polystyrene

| | |
|---|---|
| number-average molecular weight (Mn) | 33,200 |
| weight-average molecular weight (Mw) | 38,500 |
| polydispersion degree (Mw/Mn) | 1.2 |

Quantitation Data of Epoxy Group:

| | |
|---|---|
| Epoxy oxygen (% by weight) | 0.050 |
| Viscosity (25° C.): | 694 centipoises |

The novel polyorganosiloxane compound according to the present invention, which has the fluoro-containing substituent at its α-position and the epoxy-linkage-containing substituent at its ω-position, which has the fluoro-containing substituents at its α- and α′-positions and the epoxy-linkage-containing substituent at its ω-position, and which has the fluorine-containing substituents at its α-, α′-, and α″-positions and the epoxy-linkage-containing substituent at its ω-position, may provide the following advantages, when they are chemically incorporated into synthetic resins having reactive groups, such as epoxy resins, polyamides, polyurethanes or the like.

(1) A periodic reduction in characteristics can be prevented as the reactive epoxy group or groups of the polyorganosiloxane compound is or are chemically bonded to synthetic resins such as epoxy resins, polyamides, polyurethanes or synthetic resins having a substituent reactive with the epoxy group.

(2) As the fluoro-containing group exists in the same molecule, the polyorganosiloxane compounds according to the present invention provide the synthetic resins with various characteristics derived from the fluorine-containing substituent, such as water repellency, an anti-fouling property, mold releasability, non-adhesion, oil repellency, low friction properties and resistance to snow adherence, which conventional polysiloxane compounds with a trimethylsiloxy group at its terminal cannot provide, or which are better than those conventional polysiloxane compounds can provide, without impairing the various functions of the polyorganosiloxane compounds.

(3) The polyorganosiloxane compounds according to the present invention are able to have a dispersity of molecular weights within a range as narrow as from 1.1 to 1.2. In such a case, their molecular chains are said to be relatively equal in chain length so that the synthetic resin into which such a polyorganosiloxane compound is introduced can provide a modified resin with a more uniform structure than a polysiloxane compound having molecular chains having a different length. In addition, the polyorganosiloxane compounds according to the present invention prepared by the anion polymerization causes no production of a cyclic dimethylsiloxane that cannot be removed, which could not be avoided by the equilibrium reaction by means of a conventional acidic or basic catalyst, thereby preventing a reduction of characteristics, bleeding and a fluctuation in quality between products on account of the cyclic by-product and improving the properties of the resulting products.

(4) In using the polyorganosiloxane compounds according to the present invention as a graft polymer for improvements in various functions and characteristics of the synthetic resins, such as water and oil repellency, anti-fouling property, mold releasability, non-adhesion and low frictional properties, they can provide the synthetic resin with the properties possessed by the siloxane compound and, in addition thereto, with the peculiar functions inherent in the fluorine-containing substituent. And the polyorganosiloxane compound enables a provision of the synthetic resin with a relatively uniform structure and, furthermore, a control can be made over the characteristics of the resulting synthetic resin by changing the length of molecular chains of the siloxane moiety and the fluorine-containing substituent moiety in accordance with usage. Thus, as compared with the conventional dimethylsiloxane compound of the type having no fluorine-containing substituent, the polyorganosiloxane compounds permit a wide application of the synthetic resins to usage requiring high performance, particularly surface modification thereof. Such characteristics can be realized by the polyorganosiloxane compound in a lower amount than the conventional siloxane compound so that an adverse influence of the siloxane upon the basic properties of the synthetic resin can be blocked to a maximum extent.

(5) As the number of siloxane chains of the polyorganosiloxane compound on the basis of the epoxy-linkage-containing group reactive with the synthetic resin can be selected arbitrarily from one to three, as a controlled chain length of the siloxane chains can be changed, and as the kind of the fluorine-containing group residing in the siloxane chain at its terminal can be chosen, in accordance with demands, the functions required by the objective synthetic resin can be provided in a sensitively controlled manner.

What is claimed is:

1. A polyorganosiloxane compound represented by the following general formula (I):

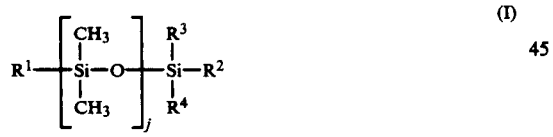

(I)

wherein
j is an integer from 2 to 2,000;
$R^1$ is a pentafluorophenyl group or a linear or branched fluoroalkyl group as represented by the following general formula (II):

$$C_aH_bF_{2a-b+1} \quad (II)$$

wherein a is an integer from 3 to 18 and b is an integer from 0 to 2a;
$R^2$ is a substituent as represented by formula (III):

(III)

wherein c is an integer from 1 to 5; or represented by the following formula (IV):

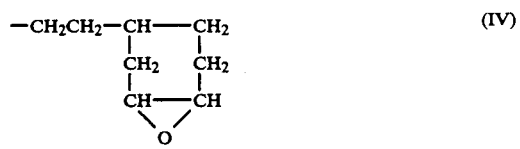

(IV)

$R^3$ and $R^4$ are independently each an alkyl group having from 1 to 4 carbon atoms or a phenyl group.

2. A polyorganosiloxane compound as claimed in claim 1, wherein the substituent represented by the symbol $R^1$ is pentafluorophenyl group, 3,3,3-trifluoropropyl group, tridecafluoro-1,1,2,2-tetrahydrooctyl group or heptadecafluoro-1,1,2,2-tetrahydrodecyl group.

3. A polyorganosiloxane compound as represented by the following general formula (V):

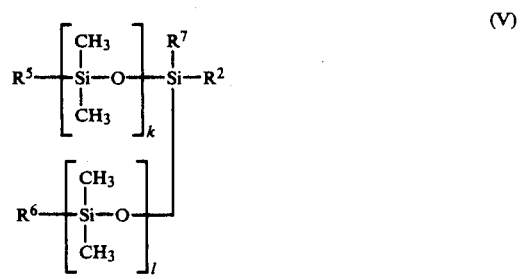

(V)

wherein
k and l each is an integer from 2 to 2,000;
$R^5$ and $R^6$ are each independently an alkyl group having from 1 to 4 carbon atoms, pentafluorophenyl group or a linear or branched fluoroalkyl group as represented by the following general formula (II):

$$C_aH_bF_{2a-b+1} \quad (II)$$

wherein a is an integer from 3 to 18 and b is an integer from 0 to 2a,
provided, however, that at least one of $R^5$ and $R^6$ is a fluoro-containing group selected from the above substituents;
$R^2$ is a substituent as represented by formula (III):

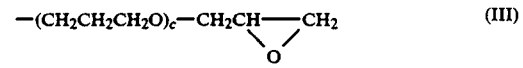

(III)

wherein c is an integer from 1 to 5; or represented by the following formula (IV):

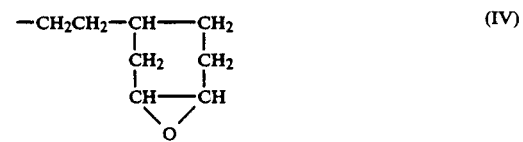

(IV)

$R^7$ is an alkyl group having from 1 to 4 carbon atoms or a phenyl group.

4. A polyorganosiloxane compound as claimed in claim 3, wherein each of the substituents represented by reference symbols $R^5$ and $R^6$ in the formula (V) is an alkyl group having 1 to four carbon atoms, pentafluorophenyl group, 3,3,3-trifluoropropyl group, tridecafluoro-1,1,2,2-tetrahydrooctyl group or heptadecafluoro-1,1,2,2-tetrahydrodecyl group; provided, however, that at least one of $R^5$ and $R^6$ is a fluoro-containing substituent selected from the above substituents.

5. A polyorganosiloxane compound as represented by the following general formula (VI):

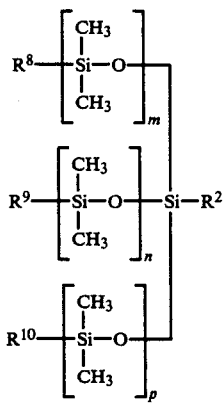

(VI)

wherein
m, n and p each is an integer from 2 to 2,000;
$R^8$, $R^9$ and $R^{10}$ are each independently an alkyl group having from 1 to 4 carbon atoms, pentafluorophenyl group or a linear or branched fluoroalkyl group as represented by the following general formula (II):

$$C_aH_bF_{2a-b+1}$$ (II)

wherein a is an integer from 3 to 18 and b is an integer from 0 to 2a;
provided, however, that at least one of $R^8$, $R^9$ and $R^{10}$ is a fluoro-containing group selected from the above substituents;
$R^2$ is a substituent as represented by following formula (III):

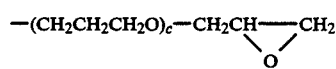

(III)

wherein c is an integer from 1 to 5; or represented by the following formula (IV):

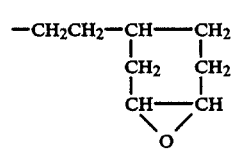

(IV)

6. A polyorganosiloxane compound as claimed in claim 5, wherein each of the substituents as represented by the reference symbols $R^8$, $R^9$ and $R^{10}$ of the general formula (VI) is an alkyl group having from 1 to 4 carbon atoms, pentafluorophenyl group, 3,3,3-trifluoropropyl group, tridecafluoro-1,1,2,2-tetrahydrooctyl group or heptadecafluoro-1,1,2,2-tetrahydrodecyl group and at least one of $R^8$, $R^9$ and $R^{10}$ is a fluoro-containing substituent selected from the above substituents.

7. A polyorganosiloxane compound as claimed in claim 1, wherein the polyorganosiloxane compound as represented by the general formula (I) has a polydispersion degree in a range from 1.1 to 1.2.

8. A polyorganosiloxane compound as claimed in claim 3, wherein the polyorganosiloxane compound as represented by the general formula (V) has a polydispersion degree in a range from 1.1 to 1.2.

9. A polyorganosiloxane compound as claimed in claim 5, wherein the polyorganosiloxane compound as represented by the general formula (VI) has a polydispersion degree in a range from 1.1 to 1.2.

10. A process for preparing a polyorganosiloxane compound as represented by following general formula (I):

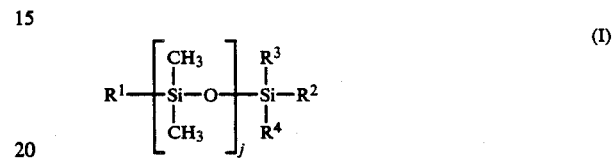

(I)

wherein
j is an integer from 2 to 2,000;
$R^1$ is a pentafluorophenyl group or a linear or branched fluoroalkyl group as represented by the following general formula (II):

$$C_aH_bF_{2a-b+1}$$ (II)

wherein a is an integer from 3 to 18 and b is an integer from 0 to 2a;
$R^2$ is a substituent as represented by following formula (III):

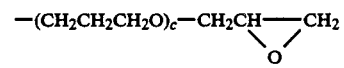

(III)

wherein c is an integer from 1 to 5; or represented by the following formula (IV):

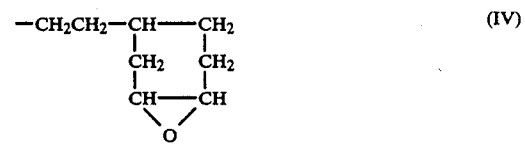

(IV)

$R^3$ and $R^4$ are each independently an alkyl group having from 1 to 4 carbon atoms or a phenyl group; comprising reacting a compound as represented by following general formula (VII):

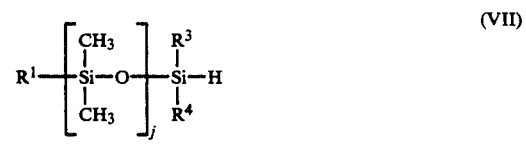

(VII)

with a compound as represented by following general formula (VIII):

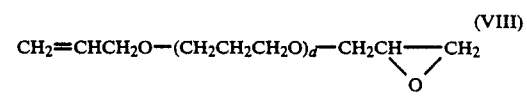

(VIII)

wherein d is an integer from 0 to 4 or a compound as represented by following general formula (IX):

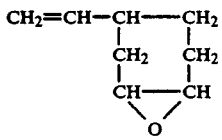

in the presence of a catalyst.

11. A process for preparing a polyorganosiloxane compound as represented by the following general formula (V):

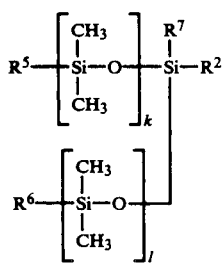

wherein k and l each is an integer from 2 to 2,000;

$R^5$ and $R^6$ are independently each an alkyl group having from 1 to 4 carbon atoms, pentafluorophenyl group or a linear or branched fluoroalkyl group as represented by the following general formula (II):

$$C_aH_bF_{2a-b+1} \quad (II)$$

wherein a is an integer from 3 to 18 and b is an integer from 0 to 2a, provided, however, that at least one of $R^5$ and $R^6$ is a fluoro-containing group selected from the above substituents;

$R^2$ is a substituent as represented by formula (III):

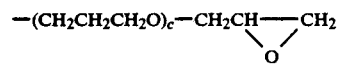

wherein c is an integer from 1 to 5; or represented by the following formula (IV):

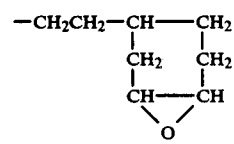

$R^7$ is an alkyl group having from 1 to 4 carbon atoms or a phenyl group;

comprising reacting a compound as represented by the following general formula:

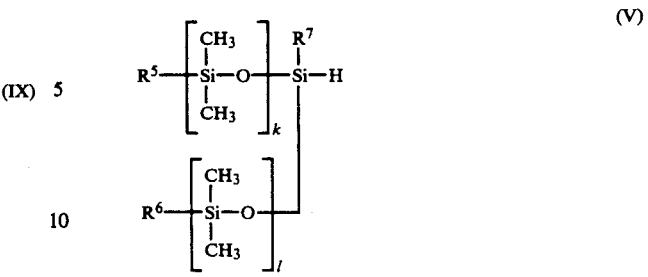

with a compound as represented by following general formula (VIII):

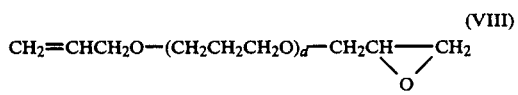

wherein d is an integer from 0 to 4 or a compound as represented by following general formula (IX):

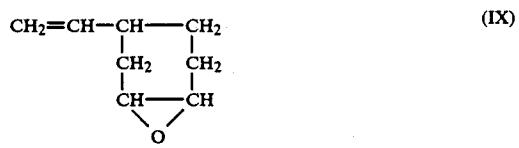

in the presence of a catalyst.

12. A process for preparing a polyorganosiloxane compound as represented by the following general formula (VI):

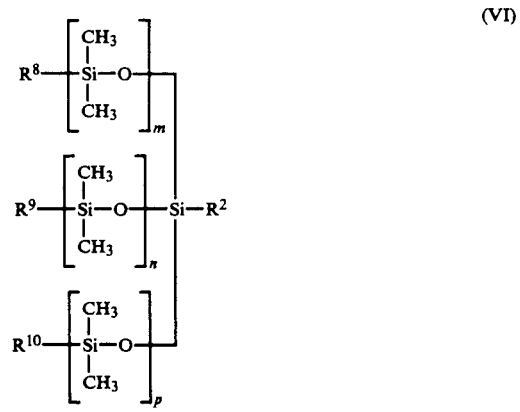

wherein m, n and p each is an integer from 2 to 2,000;

$R^8$, $R^9$ and $R^{10}$ are independently each an alkyl group having from 1 to 4 carbon atoms, pentafluorophenyl group or a linear or branched fluoroalkyl group as represented by the following general formula (II):

$$C_aH_bF_{2a-b+1} \quad (II)$$

wherein a is an integer from 3 to 18 and b is an integer from 0 to 2a;

provided, however, that at least one of $R^8$, $R^9$ and $R^{10}$ is a fluoro-containing group selected from the above substituents;

$R^2$ is a substituent as represented by following formula (III):

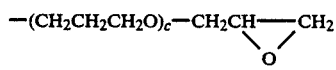

wherein c is an integer from 1 to 5; or represented by the following formula (IV):

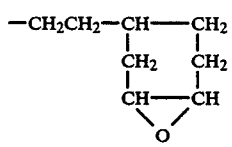

comprising reacting a compound as represented by the followng general formula:

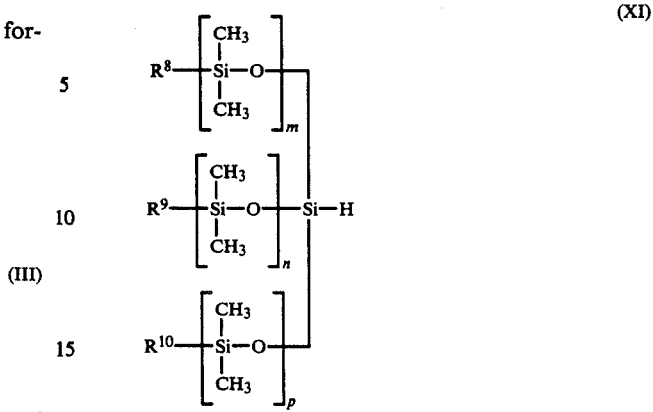

with a compound as represented by following general formula (VIII):

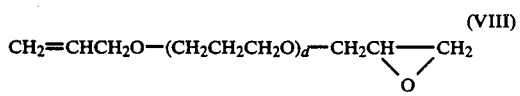

wherein d is an integer from 0 to 4
or a compound as represented by following general formula (IX):

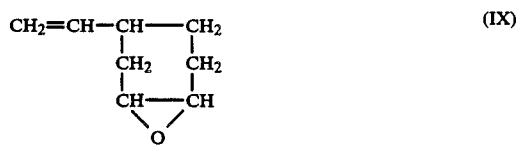

in the presence of a catalyst.

* * * * *